United States Patent [19]

Zawaski et al.

[11] Patent Number: 4,995,620
[45] Date of Patent: Feb. 26, 1991

[54] SELF-COMPENSATING SEAL FOR A ROTATING SHAFT

[75] Inventors: Michael J. Zawaski; Don B. Van Possen, both of Alliance, Ohio

[73] Assignee: Westmont Inc., Minerva, Ohio

[21] Appl. No.: 292,760

[22] Filed: Jan. 3, 1989

[51] Int. Cl.$^5$ .................. F16J 15/34; F16J 15/54; F16J 15/00
[52] U.S. Cl. .................. 277/25; 277/81 R; 277/81 S; 277/94; 277/192
[58] Field of Search .............. 277/25, 192, 198, 199, 277/181, 184, 83, 94, 93 R, 93 SD, 81 S, 154, 195, 81 R, 82, 84

[56] References Cited

U.S. PATENT DOCUMENTS

| 132,361 | 10/1872 | Furness | 277/190 |
|---|---|---|---|
| 391,991 | 10/1888 | Tripp | 277/199 |
| 509,803 | 11/1893 | Hagmann | 277/121 |
| 1,735,466 | 11/1929 | Le May | 277/199 |
| 2,784,013 | 3/1957 | Groen | 277/165 |
| 3,139,233 | 6/1964 | Simonsen | 277/81 P X |
| 3,179,334 | 4/1965 | Sharples | 277/25 X |
| 3,268,157 | 8/1966 | Frenzel | 277/82 |
| 3,502,343 | 3/1970 | Pustelnik | 277/84 X |
| 3,811,688 | 5/1974 | Smith | 277/39 |
| 4,202,554 | 5/1980 | Snell | 277/53 |
| 4,398,725 | 8/1983 | Maegawa | 277/192 |
| 4,752,077 | 6/1988 | Hoffelner | 277/22 |

FOREIGN PATENT DOCUMENTS 122089  6/1919  United Kingdom ............... 277/195

OTHER PUBLICATIONS

Marks' Standard Handbook for Mechanical Engineers, Eighth Edition, McGraw-Hill Book Company, New York.

Primary Examiner—William A. Cuchlinski, Jr.
Assistant Examiner—Scott Cummings
Attorney, Agent, or Firm—Renner, Kenner, Greive, Bobak, Taylor & Weber

[57] ABSTRACT

A self-compensating seal for a rotating shaft includes a seal ring (13) having a plurality of trapezoidal and/or triangular shaped seal sections (15). A ring housing (22) is affixed to a shaft (12) and engages the inside trailing edge (20) of the seal ring (13). Means (30, 31) are provided to prohibit circumferential rotational movement of the seal ring (13) within the ring housing (22). The ring housing (22) and the seal ring (13) rotate with the shaft (12). The centrifugal forces generated by the rotation causes the seal sections (15) to move outward from the ring housing (22) and toward a wear plate (24). Engagement of the outside leading edge (21) of the seal ring (13) and the wear plate (24) perfects the seal.

8 Claims, 6 Drawing Sheets

SELF-COMPENSATING SEAL FOR A ROTATING SHAFT

This invention was made with Government support under Contract No. F33615-88-C-2864 awarded by the Department of the Air Force. The Government has certain rights in this invention.

TECHNICAL FIELD

The present invention relates generally to a self-compensating seal for a rotating shaft. More particularly, the present invention relates to a seal which will maintain seal integrity despite excessive wear as is often found in environments such as turbine engines. Specifically, the present invention relates to a seal having a seal ring made up of a plurality of individual seal sections, which sections are caused to make a sealing contact due to the effect of centrifugal forces generated by the seal ring rotating with the shaft.

BACKGROUND ART

With the advent of modern turbine engines, much consideration has been given to the development of engine components capable of withstanding mechanical and thermal stresses far in excess of those which were known in the past. Severe conditions including high velocities of rotation and high temperatures often cause excessive wear and premature failure of engine components.

Shaft seals are an integral component of the turbine engine, and are therefore, subjected to the same severe operating conditions. It has heretofore been known in the art to use a labyrinth seal. However, these seals have proven to exhibit high leakage rates and are therefore not desirable in many applications.

Another type of turbine engine shaft seal is a brush seal having bristles formed from numerous small diameter wires. A drawback to this type of seal is that the individual wires must maintain a spring temper to be effective. Such temper is often difficult to maintain at the high temperatures at which turbine engines operate.

Thus, a need exists for a shaft seal capable of operating in environments giving rise to severely degrading conditions. Such a seal should maintain its integrity even if it wears excessively in the presence of these conditions.

DISCLOSURE OF THE INVENTION

It is, therefore, a primary object of the present invention to provide a seal for a rotating shaft capable of maintaining seal integrity in spite of excessive seal wear.

It is another object of the present invention to provide a shaft seal, as above, capable of operating under severe conditions of mechanical stress, temperature and pressure.

It is yet another object of the present invention to provide a shaft seal, as above, which has improved leakage rates.

It is a further object of the present invention to provide a shaft seal, as above, which is compliant with the shaft.

It is still another object of the present invention to provide a shaft seal, as above, which utilizes centrifugal forces generated by the shaft rotation to create and maintain the effective seal.

It is a still further object of the present invention to provide a shaft seal, as above, capable of being constructed of brittle materials which otherwise exhibit increased temperature resistance.

These and other objects of the present invention, which will become apparent from the description to follow, are accomplished by the improvements hereinafter described and claimed.

In general, a shaft seal includes a seal ring having inside and outside edges. The seal ring can be made up of a plurality of individual seal sections, each section placed adjacent to another section. The seal ring engages a channel in a housing ring, the engagement including means to prohibit the seal ring from circumferentially rotating within the housing channel. The ring housing is affixed to the shaft. A wear plate engages the outside edge of the seal ring. The configuration causes the seal ring and ring housing to rotate with the rotating shaft. The centrifugal forces generated by the rotation cause the seal sections to move out of the channel and toward the wear plate, effecting the seal. Thus the seal will be maintained despite any wear which may occur to the seal sections.

PREFERRED EMBODIMENTS FOR CARRYING OUT THE INVENTION

Figure 1:
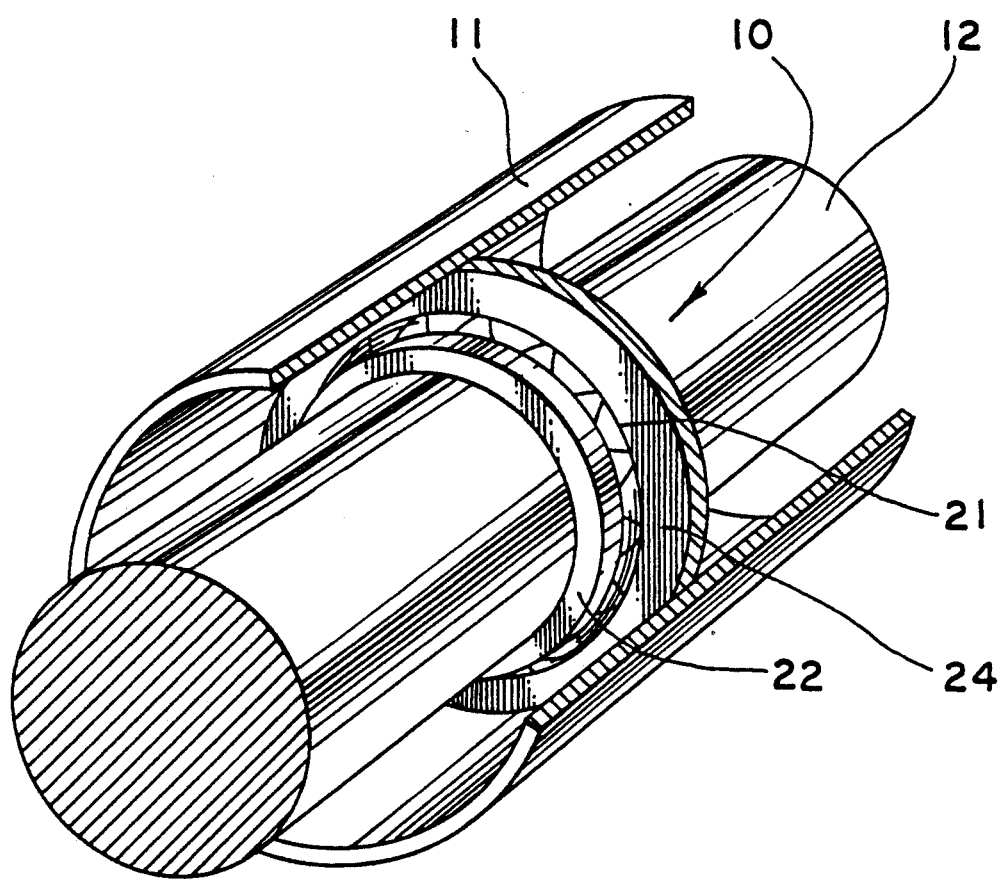
FIG. 1 is a somewhat schematic and partially broken away perspective view of a seal for a rotating shaft embodying the concept of the present invention.

A seal for a rotating shaft according to the concept of the present invention is indicated generally by the numeral 10 in FIG. 1 of the drawings. Seal 10 is depicted in conjunction with an exemplary environment having an engine housing 11 and a shaft 12. Such an environment may be found in a turbine engine. It should be appreciated that the present invention is useful in any environment having a rotating shaft.

Figure 2:
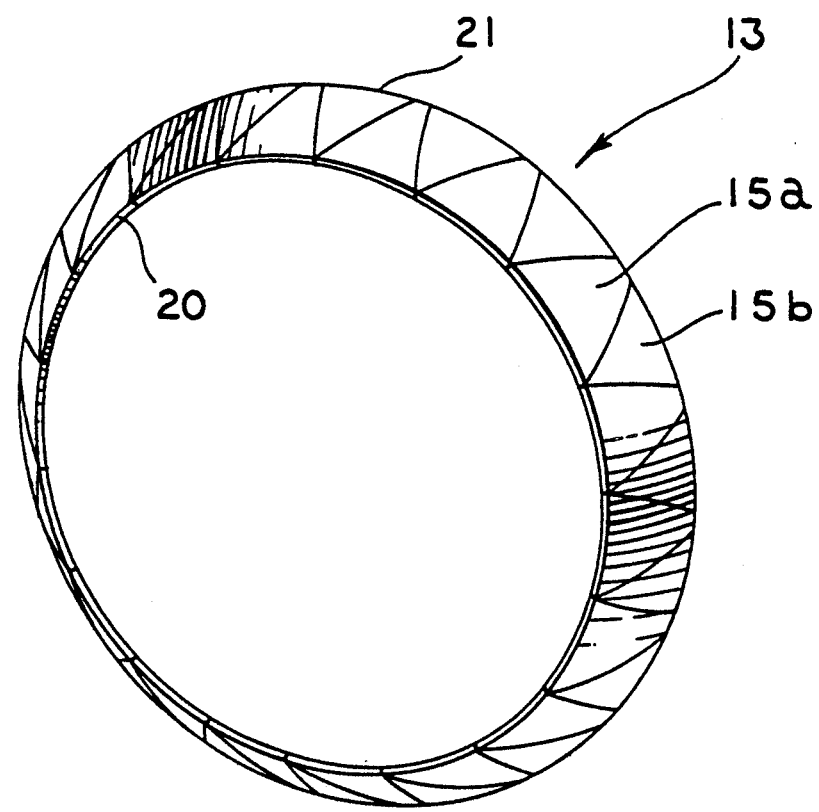
FIG. 2 is a perspective view of one embodiment of a seal ring useful in accomplishing the concept of the present invention.

As best shown in FIG. 2, the seal 10 comprises a seal ring generally indicated by the numeral 13. Seal ring 13 in turn includes a plurality of alternating seal sections 15a and 15b. In the embodiment depicted in the drawings, seal section 15a is trapezoidal in shape and seal section 15b is triangular. However, it is to be understood that the invention may utilize seal sections of all one shape or the other, or an alternating combination of both as shown.

Figure 10:
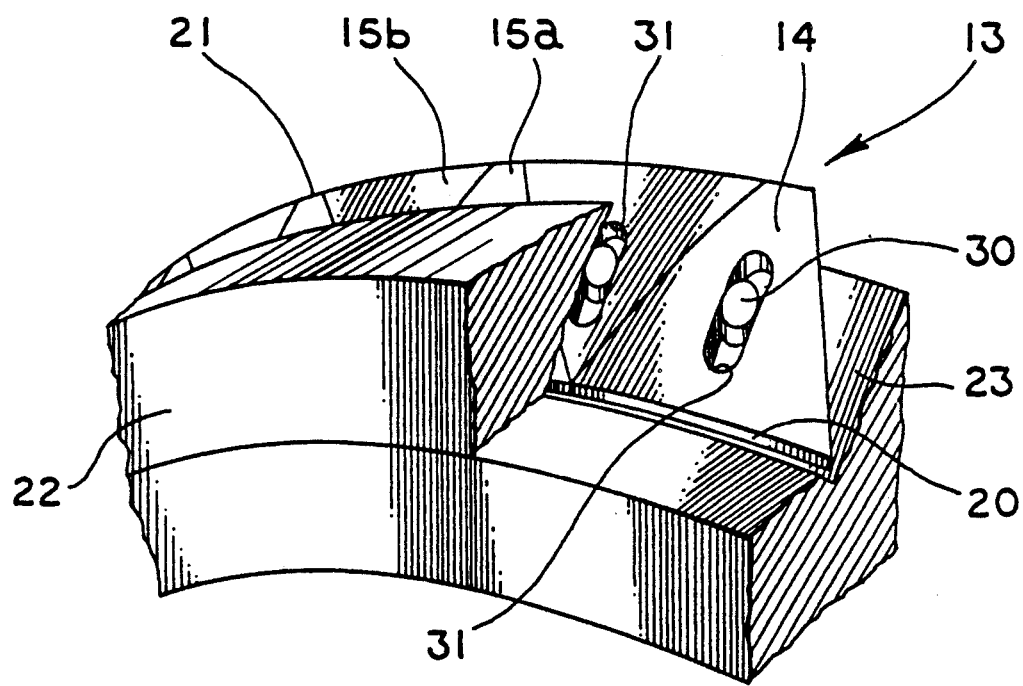
FIG. 10 is a partially broken away fragmentary perspective view of the seal ring of FIG. 2 shown in conjunction with a housing ring.

Seal ring 13 has inside trailing edge 20 and outside leading edge 21. As shown in FIG. 10, a ring housing 22 having channel 23 therein, engages inside trailing edge 20 and a portion of the ring seal 13 lengthwise surface 14. Ring housing 22 is affixed by any suitable means such as press-fitting, screwing or welding, to the shaft 12 (FIG. 1), so that as shaft 12 rotates, ring housing 22 rotates therewith.

In order to assure that as ring housing 22 rotates, seal ring 13 also rotates, preventing circumferential movement of the seal ring 13 within the ring housing 22, pins 30, or any suitable equivalent attaching device, are affixed to ring housing 22 so as to extend into channel 23. A slot 31 is provided in at least one seal section 15a or 15b, and accepts engagement with pin 30. Slot 31 is positioned in seal sections 15a or 15b running generally in a direction from inside trailing edge 20 to outside leading edge 21. Thus, seal sections 15a and 15b are free to move in a direction away from the axis of rotation, but are prevented from rotating circumferentially within ring housing 22. Other means of preventing such circumferential rotation could include, for example, a series of valleys and ridges in both channel 23 and seal sections 15a and 15b.

A wear plate 24 encircles the shaft 12, and may be disc or washer-like in shape. Outside leading edge 21 of seal ring 13 engages wear plate 24 (FIG. 3).

Figure 3:
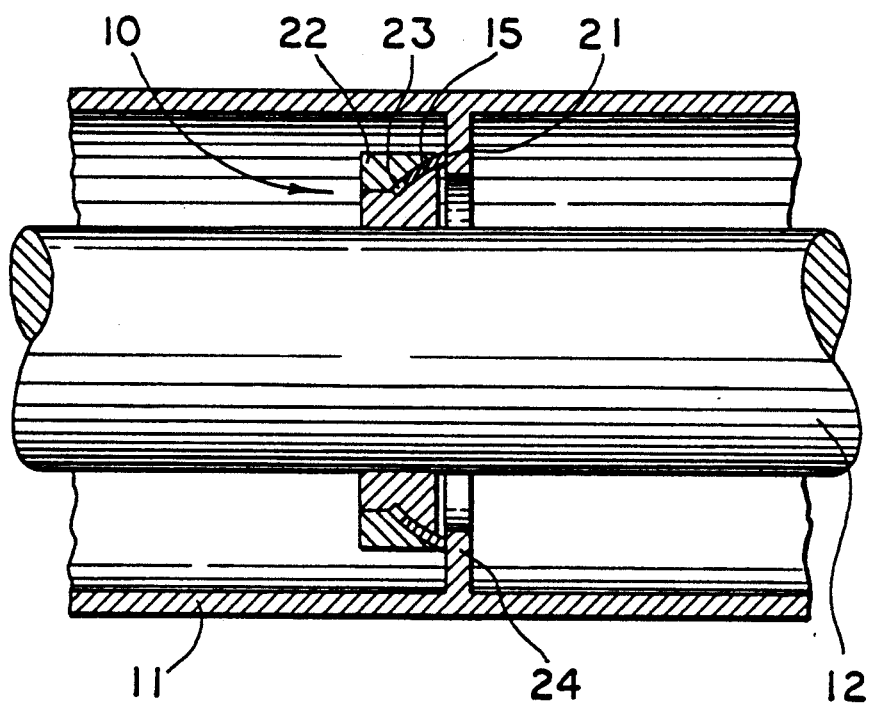
FIG. 3 is a fragmentary sectional view of the seal and rotating shaft of FIG. 1 utilizing the seal ring of FIG. 2.
Figure 4:
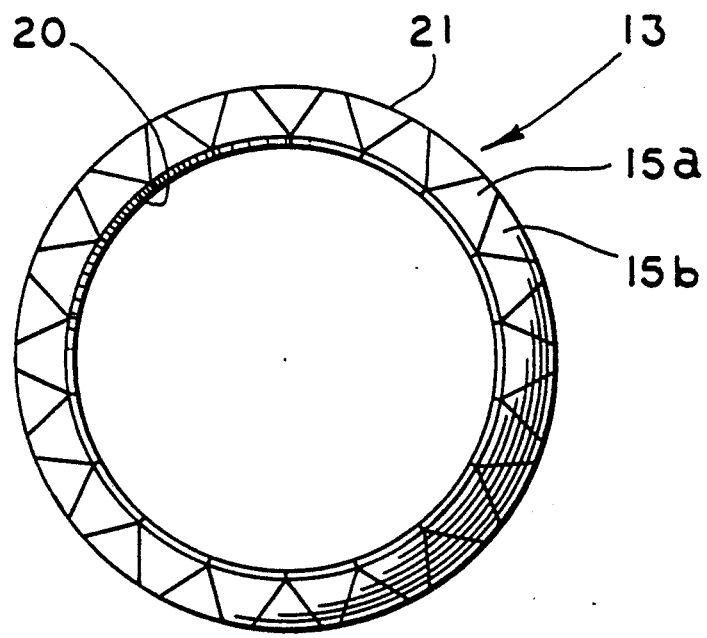
FIG. 4 is a front elevational view of the seal ring of FIG. 2.

In the embodiment of the seal 10 depicted in FIGS. 1-5, 9 and 10, seal ring 13 is shaped in the configuration of the shell of the zone of a sphere. Seal sections 15a and 15b are curved when viewed from their lengthwise cross section (FIG. 3). The radius of curvature is such that if the curved sections were continued in either direction, the result would be a spherical structure.

When seal 10 is in place, ring housing 22 and seal ring 13 rotates with shaft 12. Outside leading edge 21 of seal ring 13 rubs against the stationary wear plate 24 to effect sealing engagement. Centrifugal forces generated by the rotational movement will impart two vector component forces to the seal ring 13, one directed meridionally outward toward wear plate 24, and one radially against the outer side of the channel 23. Because seal sections 15 can move meridionally within channel 23, outside leading edge 21 is continually held in sealing contact against wear plate 24, perfecting the seal. As may be appreciated, the greater the centrifugal forces generated by the rotation, the greater the force imparted to the sealing engagement.

As outside leading edge 21 rubs against wear plate 24, wearing of the seal sections 15 may occur, especially under the severe conditions found in environments such as turbine engines. The unique geometric shapes of the seal sections 15a and 15b allow the seal ring 13 to remain intact and in engagement with wear plate 24, maintaining seal integrity, despite section wearing.

As the small side of the trapezoid shaped seal section 15a wears, the portion of outside leading edge 21 formed by that section becomes larger. Conversely, as the adjacent triangular shaped seal section 15b wears, the portion of outside leading edge 21 formed thereby (that is, the edge of the triangle opposite the apex) becomes proportionally smaller. Hence, the circumferential dimension of outside leading edge 21 remains the same despite wearing, which maintains seal integrity. It is to be appreciated that the seal 10 will operate whether the seal ring 13 is completely made up of trapezoidal seal sections 15a, triangular seal sections 15b or alternating sections of both. Further, seal 10 will operate regardless of whether the outside leading edge 21 is formed of the apex or base portions of seal sections 15a are utilized, the seal 10 will operate regardless of whether a longer or a shorter edge of the section is part of outside leading edge 21.

Figure 5:
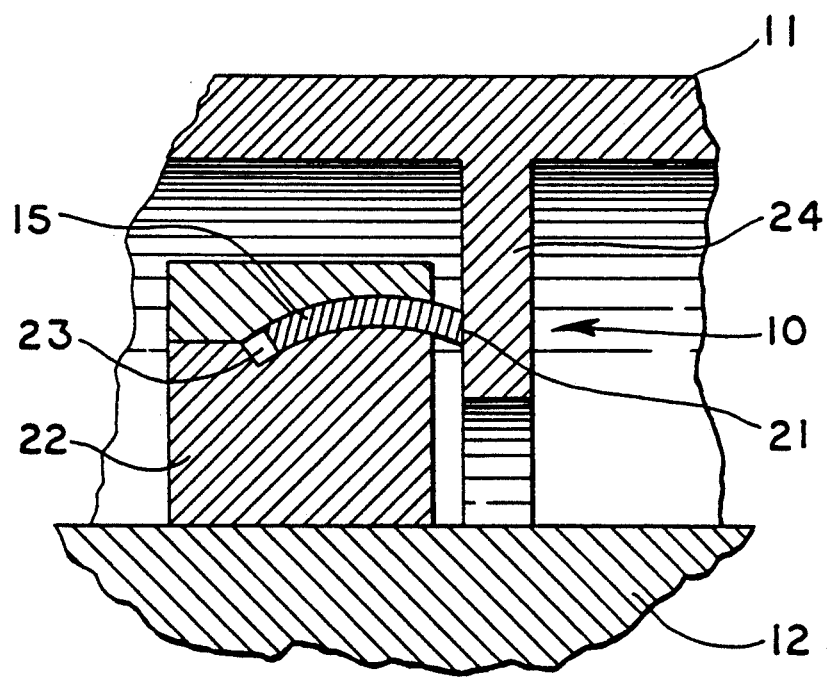
FIG. 5 is an enlarged fragmentary sectional view similar to FIG. 3 but showing an alternate configuration for the seal sections of the seal ring.

It has been found that by varying the meridional length of the seal sections, represented generally by the numeral 15 in FIG. 5, the forces at the plane of engagement between seal sections 15 and wear plate 24 can be either increased or decreased. In the depiction of the seal 10 in FIG. 5, seal section 15 is a portion of the surface of an imaginary sphere. The plane of engagement between seal section 15 and wear plate 24 would not pass through the center of the sphere. By adjusting the length of the seal section 15, the plane of engagement can be made to pass through the center of the sphere or at any point thereof. This adjustment causes the plane of engagement between the outside leading edge 21 and the wear plate 24 to change with respect to the axis of rotation of shaft 12. This adjustment also causes changes in the two vector components of the centrifugal force generated by the rotation. Hence, the forces at the engagement of seal ring 13 and wear plate 24 can also be adjusted.

Figure 6:
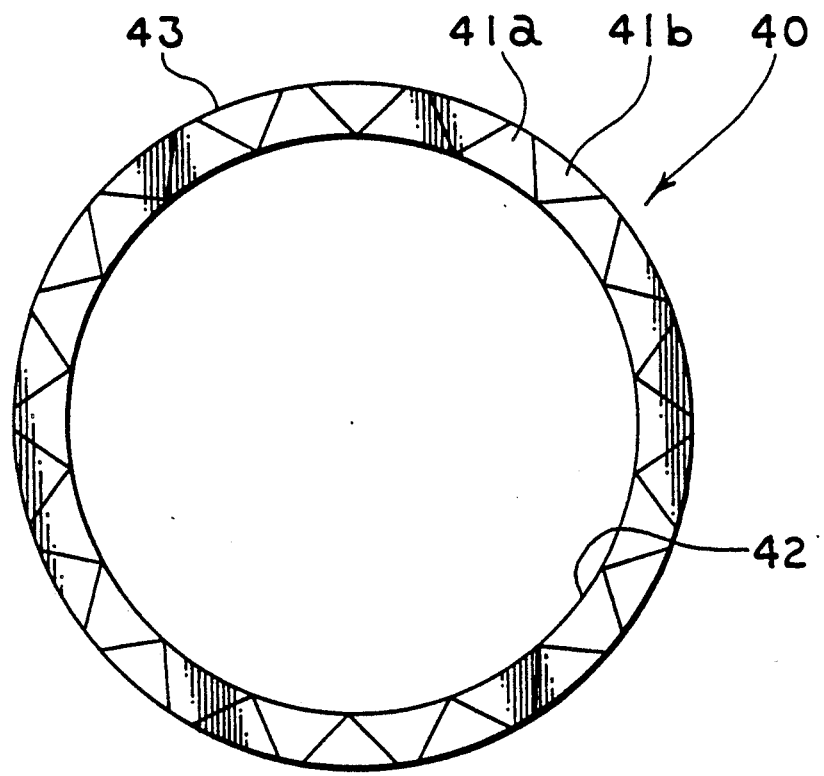
FIG. 6 is a front elevational view of a second embodiment of a seal ring useful in accomplishing the concept of the present invention.
Figure 7:
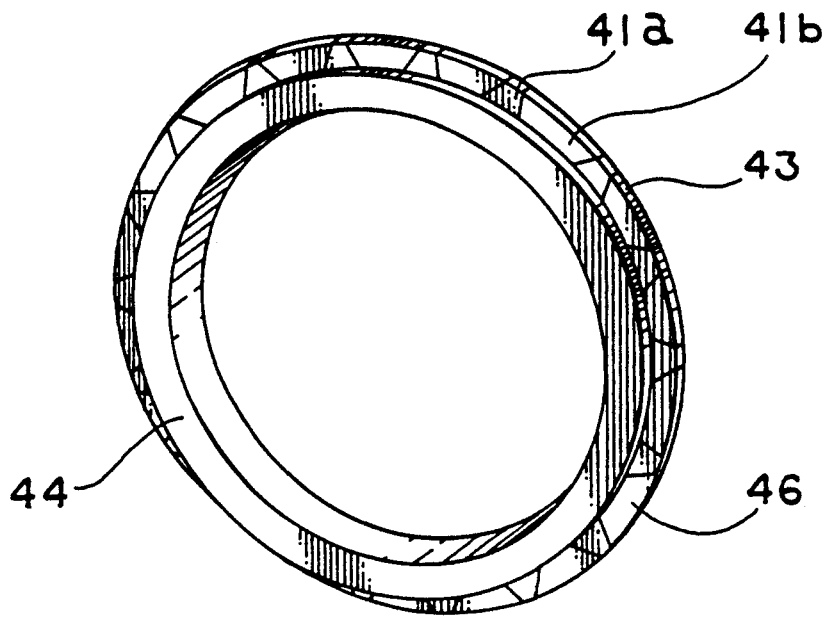
FIG. 7 is perspective view of the seal ring of FIG. 6 shown in conjunction with a housing ring.
Figure 8:
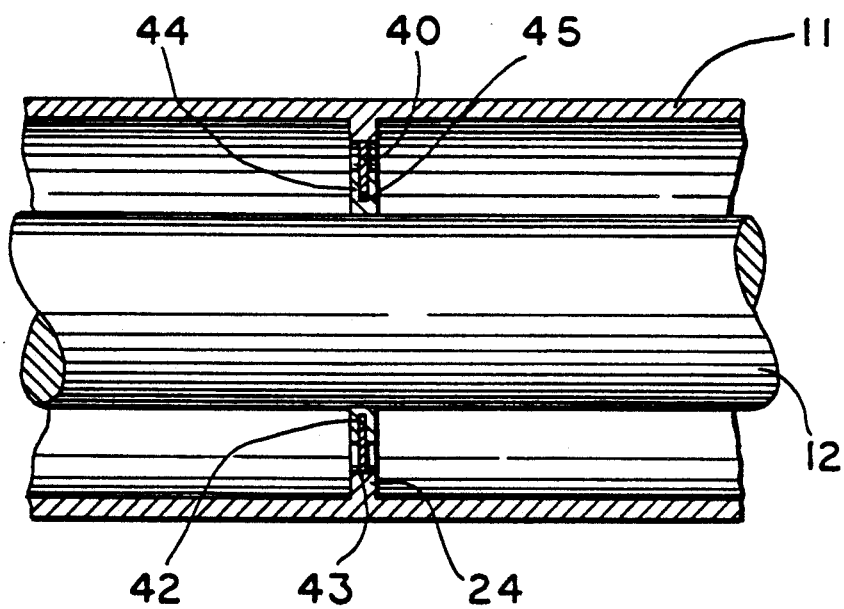
FIG. 8 is a fragmentary sectional view of a seal for a rotating shaft employing the seal ring and housing ring of FIG. 7.

A second embodiment of the present invention is depicted in FIGS. 6-8 of the attached drawings. FIG. 6 shows a seal ring 40 wherein seal sections 41a and 41b are not curved as if being part of the surface of a sphere. Instead, the seal sections 41a and 41b are flat, so that the seal ring 40 is disc-like in shape, and the lengthwise surfaces 46 of the sections are in the same plane when in position forming seal ring 40 (FIG. 7). Again, seal ring 40 has inside trailing edge 42 and outside leading edge 43. Also, as with the first embodiment, seal ring 40 can be constructed completely of seal trapezoidal sections 41a, triangular sections 41b or an alternating combination of both.

A ring housing 44 having U-channel 45 engages inside trailing edge 42 of seal ring 40, and a portion of its lengthwise side 46. Circumferential rotation of the seal ring 40 within U-channel 45 of ring housing 44 can be prevented by any suitable construction such as the pin and slot engagements depicted in FIG. 10 with respect to the first embodiment, or any suitable means which permits outward radial movement of seal sections 41a and 41b away from the bottom of U-channel 45.

Ring housing 44 is affixed by any suitable means to shaft 12 (FIG. 8). Wear plate 24 encircles shaft 12 and seal ring 40, and its inside surface engages outside leading edge 43 of seal ring 40. Centrifugal forces generated by the rotation of shaft 12, ring housing 44 and seal ring 40 cause seal sections 41a and 41b to move toward wear plate 24, perfecting the seal. As portions of the seal sections are worn, the geometry of the sections allows the seal integrity to be maintained in a manner similar to that described above.

Figure 9:
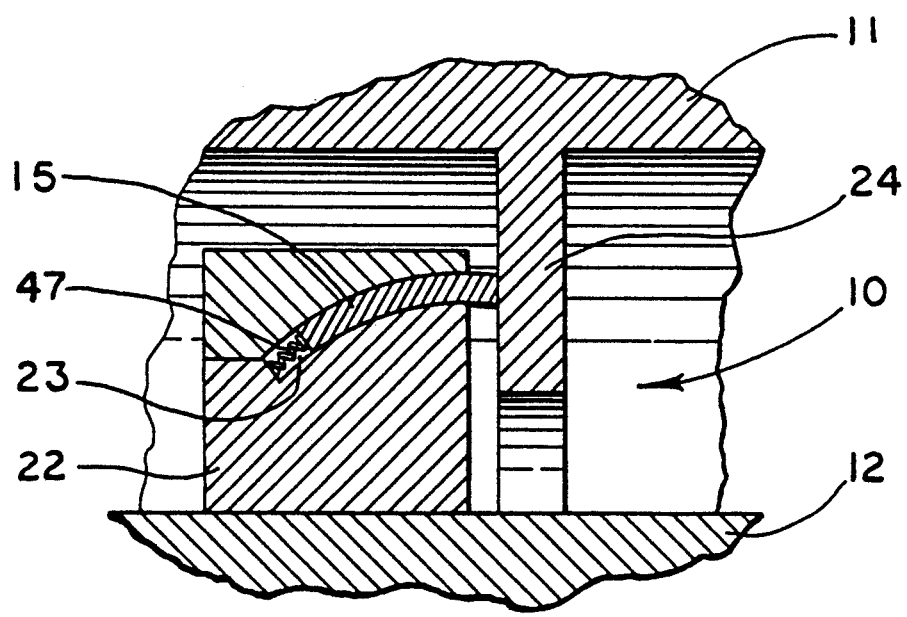
FIG. 9 is an enlarged fragmentary sectional view of the seal of FIG. 3 having a force adjustment feature.

As shown in FIG. 9, a spring 47 may be provided at the bottom of channel 23 of ring housing 22. The tension of the spring 47 may be adjusted to increase force toward the wear plate 24, or it can be adjusted to pull the seal section 15 away from wear plate 24. In this way, the force at the plane of engagement between seal section 15 and wear plate 24 can be uniformly adjusted. It is to be appreciated that the adjustment feature provided by spring 47, or its equivalent may be utilized with either embodiment of the seal 10.

Wear plate 24 is depicted in the drawings as being a flat washer-like structure. The portion of wear plate 24 which engages outside leading edges 21 and 43 of seal rings 13 and 40 respectively, can be of differing geometries without departing from the spirit of the invention. For instance, the wear plate 24 can itself have a channel similar to channels 23 and 45, engaging outside leading edges 21 and 43.

It has been found that by utilizing individual seal sections 15a, 15b, 41a and 41b to create seal rings 13 and 40, the mechanical stresses placed upon the individual sections are less than those which would be placed upon a solid ring. This is an important consideration because of the high temperatures often encountered with rotating shafts, as is the case with turbine engines. Materials with efficient high temperature resistance, such as ceramics, are often brittle. A solid ceramic ring would not be capable of withstanding the mechanical stresses applied. By using a ring made of individual sections, the same ceramic materials can be used, providing temperature resistance and resistance to high mechanical stress.

A still further advantageous result of the seal 10 is that it is compliant with the shaft 12. As is the case with turbine engines and many rotating shafts, shafts will often move slightly, such as from side-to-side or they may oscillate about a point somewhere along their axis of rotation. To maintain seal integrity, a seal must be capable of adjusting for such variations. That is, the seal must be compliant. Because the individual sections of seal rings 13 and 40 interact with each other, seal integrity will not be breached despite the oscillations and deformations of the shaft 12.

Seal 10 is also useful with counter-rotating shafts. For instance, in FIG. 3, if engine housing 11 is thought of as being a tubular shaft, rotating in a direction opposite to that of shaft 12, seal 10 is still operable. The difference between this use and that described above, is that wear plate 24 will rotate as opposed to being stationary. Seal integrity is not compromised and is still maintained.

Thus, it should be evident that a self-compensating seal for a rotating shaft embodying the concept of the invention disclosed herein carries out the various objects of the invention and otherwise constitutes an advantageous contribution to the art.

We claim:

1. A seal for a rotating shaft comprising a seal ring having radially inner and radially outer edges, said seal ring including a plurality of seal sections, each of said seal sections being triangular in shape and being positioned adjacent to another seal section, said seal ring being in the shape of a shell of the zone of a sphere, a ring housing having a channel therein, said ring housing substantially encircling the shaft such that said ring housing has a circumferential surface in direct opposition to the shaft, said ring housing channel engaging said radially inner edge of said seal ring, means to prohibit circumferential movement of said seal ring within said ring housing channel, means to affix said ring housing to the shaft so that said ring housing and said seal ring rotate with the shaft, said means to affix said ring housing including engagement of the shaft with said circumferential surface in direct opposition to the shaft, and a wear plate being disc-like in shape and having a radially extending surface and an axially extending surface and engaging said radially outer edge of said seal ring at said radially extending surface, whereby the centrifugal forces generated by the rotation of the shaft causes said seal sections to move within said ring housing channel in a direction toward said wear plate, so that said engagement between said seal sections and said wear plate is maintained despite wearing of said seal sections.

2. A seal for a rotating shaft comprising a seal ring having radially inner and radially outer edges, said seal ring including a plurality of seal sections, each of said seal sections being positioned adjacent to another seal section with adjacent seal sections being alternatingly trapezoidal and triangular in shape, said seal ring being in the shape of a shell of the zone of a sphere, a ring housing having a channel therein, said ring housing substantially encircling the shaft such that said ring housing has a circumferential surface in direct opposition to the shaft, said ring housing channel engaging said radially inner edge of said seal ring, means to prohibit circumferential movement of said seal ring within said ring housing channel, means to affix said ring housing to the shaft so that said ring housing and said seal ring rotate with the shaft, said means to affix said ring housing including engagement of the shaft with said circumferential surface in direct opposition to the shaft, and a wear plate being disc-like in shape and having a radially extending surface and an axially extending surface and engaging said radially outer edge of said seal ring at said radially extending surface, whereby the centrifugal forces generated by the rotation of the shaft causes said seal sections to move within said ring housing channel in a direction toward said wear plate, so that said engagement between said seal sections and said wear plate is maintained despite wearing of said seal sections.

3. A seal for a rotating shaft comprising a seal ring having radially inner and radially outer edges, said seal ring including a plurality of seal sections, each of said seal sections being trapezoidal in shape and positioned adjacent to another seal section, said seal ring being in the shape of a shell of the zone of a sphere, a ring housing having a channel therein, said ring housing substantially encircling the shaft such that said ring housing has a circumferential surface in direct opposition to the shaft, said ring housing channel engaging said radially inner edge of said seal ring, means to prohibit circumferential movement of said seal ring within said ring housing channel, means to affix said ring housing to the shaft so that said ring housing and said seal ring rotate with the shaft, said means to affix said ring housing including engagement of the shaft with said circumferential surface in direct opposition to the shaft, and a wear plate being disc-like in shape and having a radially extending surface and an axially extending surface and engaging said radially outer edge of said seal ring at said radially extending axial surface, whereby the centrifugal forces generated by the rotation of the shaft causes said seal sections to move within said ring housing channel in a direction toward said wear plate, so that said engagement between said seal sections and said wear plate is maintained despite wearing of said seal sections.

4. A seal as in claim 1, 2, or 3 wherein said means to prohibit circumferential movement of said seal ring within said ring housing channel includes at least one pin extending from said ring housing into said ring housing channel and engaging a slot in at least one said seal sections.

5. A seal as in claim 1, 2, or 3 wherein said seal further comprises adjustment means acting upon at least one of said seal sections to vary the force of said seal sections on said wear plate.

6. A seal for a rotating shaft comprising a seal ring having radially inner and radially outer edges, said seal ring including a plurality of seal sections, each of said seal sections being triangular in shape and being positioned adjacent to another seal section, said seal sections being flat such that said seal ring is disc-like in shape, a ring housing having a channel therein, said ring housing substantially encircling the shaft such that said ring housing has a circumferential surface in direct opposition to the shaft, said ring housing channel engaging said radially inner edge of said seal ring, means to prohibit circumferential movement of said seal ring within said ring housing channel, means to affix said ring housing to the shaft so that said ring housing and said seal ring rotate with the shaft, said means to affix said ring housing including engagement of the shaft with said circumferential surface in direct opposition to the shaft, and a wear plate being disc-like in shape and having a radially extending surface and an axially extending surface and engaging said radially outer edge of said seal ring at said axially extending surface, whereby the centrifugal forces generated by the rotation of the shaft causes said seal sections to move within said ring housing channel in a direction toward said wear plate, so that said engagement between said seal sections and said wear plate is maintained despite wearing of said seal sections.

7. A seal for a rotating shaft comprising a seal ring having radially inner and radially outer edges, said seal ring including a plurality of seal sections, each of said seal sections being positioned adjacent to another seal section with adjacent seal sections being alternatingly trapezoidal and triangular in shape, said seal sections being flat such that said seal ring is disc-like in shape, a ring housing having a channel therein, said ring housing substantially encircling the shaft such that said ring housing has a circumferential surface in direct opposition to the shaft, said ring housing channel engaging said radially inner edge of said seal ring, means to prohibit circumferential movement of said seal ring within said ring housing channel, means to affix said ring housing to the shaft so that said ring housing and said seal ring rotate with the shaft, said means to affix said ring housing including engagement of the shaft with said circumferential surface in direct opposition to the shaft, and a wear plate being disc-like in shape and having a radially extending surface and an axially extending surface and engaging said radially outer edge of said seal ring at said axially extending surface whereby the centrifugal forces generated by the rotation of the shaft causes said seal sections to move within said ring housing channel in a direction toward said wear plate, so that said engagement between said seal sections and said wear plate is maintained despite wearing of said seal sections.

8. A seal for a rotating shaft comprising a seal ring having radially inner and radially outer edges, said seal ring including a plurality of seal sections, each of said seal sections being trapezoidal in shape and positioned adjacent to another seal section, said seal sections being flat such that said seal ring is disc-like in shape, a ring housing having a channel therein, said ring housing substantially encircling the shaft such that said ring housing has a circumferential surface in direct opposition to the shaft, said ring housing channel engaging said radially inner edge of said seal ring, means to prohibit circumferential movement of said seal ring within said ring housing channel, means to affix said ring housing to the shaft so that said ring housing and said seal ring rotate with the shaft, said means to affix said ring housing including engagement of the shaft with said circumferential surface in direct opposition to the shaft, and a wear plate being disc-like in shape and having a axially extending surface and an axially extending surface and engaging said radially outer of said seal ring at said axially extending surface, whereby the centrifugal forces generated by the rotation of the shaft causes said seal sections to move within said ring housing channel in a direction toward said wear plate, so that said engagement between said seal sections and said wear plate is maintained despite wearing of said seal sections.

* * * * *

UNITED STATES PATENT AND TRADEMARK OFFICE
CERTIFICATE OF CORRECTION

PATENT NO. : 4,995,620

DATED : February 26, 1991

INVENTOR(S) : Michael J. Zawaski and Don B. Van Fossen

It is certified that error appears in the above-identified patent and that said Letters Patent is hereby corrected as shown below:

Cover page, [75], "Van Possen" should read --Van Fossen--.

Column 4, line 4, following the word "of" (second occurrence) insert --triangular seal sections 15b. Similarly, when trapezoidal--.

Column 6, line 53, claim 3, line 21, delete the word "axial".

Column 8, line 33, claim 8, line 19, "axially" (first occurrence) should read --radially--.

Signed and Sealed this

Second Day of March, 1993

Attest:

STEPHEN G. KUNIN

*Attesting Officer*    *Acting Commissioner of Patents and Trademarks*